United States Patent
Kinoshita et al.

(10) Patent No.: US 12,191,709 B2
(45) Date of Patent: Jan. 7, 2025

(54) ELECTRIC ROTATING MACHINE WITH STATOR HAVING CORE BACK PORTIONS WITH WELDING PORTIONS

(71) Applicant: Mitsubishi Electric Corporation, Tokyo (JP)

(72) Inventors: Tomoyuki Kinoshita, Tokyo (JP); Tatsuro Hino, Tokyo (JP); Kouta Katsuragi, Tokyo (JP); Satoshi Ekino, Tokyo (JP); Kazuya Hasegawa, Tokyo (JP); Norihiro Murata, Tokyo (JP); Akihito Mori, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 553 days.

(21) Appl. No.: 17/613,169

(22) PCT Filed: Oct. 2, 2019

(86) PCT No.: PCT/JP2019/038844
§ 371 (c)(1),
(2) Date: Nov. 22, 2021

(87) PCT Pub. No.: WO2021/064883
PCT Pub. Date: Apr. 8, 2021

(65) Prior Publication Data
US 2022/0209593 A1     Jun. 30, 2022

(51) Int. Cl.
*H02K 1/18*     (2006.01)
*H02K 1/14*     (2006.01)

(52) U.S. Cl.
CPC ............ *H02K 1/185* (2013.01); *H02K 1/148* (2013.01)

(58) Field of Classification Search
CPC ............ H02K 1/148; H02K 1/12; H02K 1/14; H02K 1/141; H02K 1/143; H02K 1/145;
(Continued)

(56) References Cited

U.S. PATENT DOCUMENTS 5,142,178 A * 8/1992 Kloster ............... H02K 1/26
                                                  310/216.048
5,338,996 A * 8/1994 Yamamoto ............ H02K 1/26
                                                    336/234
(Continued)

FOREIGN PATENT DOCUMENTS

JP     2004-096845 A     3/2004
JP     2004-274970 A     9/2004
(Continued)

OTHER PUBLICATIONS

International Search Report of PCT/JP2019/038844 dated Dec. 3, 2019 [PCT/ISA/210].
(Continued)

*Primary Examiner* — Maged M Almawri
(74) *Attorney, Agent, or Firm* — Sughrue Mion, PLLC; Richard C. Turner

(57) ABSTRACT

An outer-circumferential side of a core-back portion of a stator iron core has a welding portion that is provided in such a way as to ride on two or more electromagnetic steel plates including electromagnetic steel plates situated at a stacking-direction end portion of the stator iron core; the welding portion is provided partly in the stacking-direction of the stator iron core.

9 Claims, 9 Drawing Sheets

(58) Field of Classification Search
CPC ............ H02K 1/146; H02K 1/16; H02K 1/18;
H02K 1/182; H02K 1/185; H02K 1/187;
H02K 1/06; H02K 15/022; H02K 3/522
USPC ............... 310/49.29, 254.1, 4, 126, 216.001,
310/216.113, 216.125–216.129,
310/216.131–216.137, 216.008,
310/216.125–216.129, 216.131–216.137
See application file for complete search history.

(56) References Cited

U.S. PATENT DOCUMENTS

| | | | | |
|---|---|---|---|---|
| 5,448,119 | A * | 9/1995 | Kono | H02K 7/14 310/90 |
| 6,249,072 | B1 * | 6/2001 | Sakagami | H02K 15/022 310/216.004 |
| 6,262,511 | B1 * | 7/2001 | Ohashi | H02K 1/16 29/516 |
| 7,859,163 | B2 * | 12/2010 | Bertocchi | H01F 41/0233 310/216.048 |
| 7,952,254 | B2 * | 5/2011 | Cho | H02K 3/345 310/216.118 |
| 7,982,356 | B2 * | 7/2011 | Buban | H02K 1/148 310/216.118 |
| 8,106,561 | B2 * | 1/2012 | Myojin | H02K 1/148 310/216.013 |
| 8,581,468 | B2 * | 11/2013 | Kudose | H02K 1/16 310/216.049 |
| 10,340,754 | B2 * | 7/2019 | Ogino | H02K 1/18 |
| 10,348,170 | B2 * | 7/2019 | Izumi | H02K 15/024 |
| 10,491,059 | B2 * | 11/2019 | Murakami | H02K 1/185 |
| 10,505,407 | B2 * | 12/2019 | Nagao | H02K 3/345 |
| 10,819,201 | B2 * | 10/2020 | Thumm | H02K 17/165 |
| 11,271,459 | B2 * | 3/2022 | Ushida | B23K 26/262 |
| 11,456,629 | B2 * | 9/2022 | Sato | H02K 1/148 |
| 11,616,407 | B2 * | 3/2023 | Hino | H02K 1/165 310/216.007 |
| 11,742,129 | B2 * | 8/2023 | Fujii | H01F 27/245 310/216.065 |
| 11,942,823 | B2 * | 3/2024 | Kim | H02K 1/165 |
| 11,973,369 | B2 * | 4/2024 | Fujimura | H02K 1/146 |
| 11,996,231 | B2 * | 5/2024 | Hirayama | H02K 1/18 |
| 2002/0047459 | A1 * | 4/2002 | Adaeda | H02K 21/222 310/216.048 |
| 2002/0140315 | A1 * | 10/2002 | Harada | H02K 1/16 310/254.1 |
| 2002/0145359 | A1 * | 10/2002 | Nishiyama | H02K 15/022 310/216.065 |
| 2004/0056556 | A1 * | 3/2004 | Fujita | H02K 15/022 29/609 |
| 2004/0217669 | A1 * | 11/2004 | Fujii | H02K 1/148 310/216.045 |
| 2006/0066171 | A1 * | 3/2006 | Yanoi | H02K 1/148 310/254.1 |
| 2006/0125341 | A1 * | 6/2006 | Rau | H02K 1/16 310/254.1 |
| 2007/0040467 | A1 * | 2/2007 | Gu | H02K 3/522 310/260 |
| 2007/0182268 | A1 * | 8/2007 | Hashiba | H02K 1/146 310/67 R |
| 2008/0088197 | A1 | 4/2008 | Okamoto et al. | |
| 2008/0111443 | A1 * | 5/2008 | Okamoto | H02K 15/024 310/430 |
| 2010/0219714 | A1 * | 9/2010 | Abe | H02K 1/146 310/216.048 |
| 2010/0244617 | A1 * | 9/2010 | Nobata | H02K 3/50 310/216.069 |
| 2013/0026878 | A1 * | 1/2013 | Feuerrohr | A23L 2/52 310/216.136 |
| 2013/0154434 | A1 * | 6/2013 | Hasegawa | H02K 1/16 310/216.004 |
| 2013/0221781 | A1 | 8/2013 | Nakayama et al. | |
| 2014/0361657 | A1 * | 12/2014 | Vohlgemuth | H02K 15/022 29/596 |
| 2015/0256037 | A1 * | 9/2015 | Kudose | H02K 3/30 310/45 |
| 2016/0023447 | A1 * | 1/2016 | Shimizu | H02K 15/02 156/247 |
| 2016/0164350 | A1 * | 6/2016 | Matsunaga | H02K 15/022 156/219 |
| 2016/0211717 | A1 * | 7/2016 | Honda | F04D 13/0693 |
| 2016/0352165 | A1 * | 12/2016 | Fubuki | H02K 1/22 |
| 2018/0212482 | A1 * | 7/2018 | Nigo | H02K 7/14 |
| 2018/0269731 | A1 * | 9/2018 | Ogino | H02K 15/12 |
| 2019/0157919 | A1 * | 5/2019 | Ge | H02K 1/148 |
| 2019/0356180 | A1 * | 11/2019 | Nakamura | H02K 1/165 |
| 2020/0186014 | A1 * | 6/2020 | Kusuyama | B21D 37/18 |
| 2020/0244113 | A1 * | 7/2020 | Deng | H02K 15/022 |
| 2021/0091610 | A1 * | 3/2021 | Walter | H02K 1/148 |
| 2021/0296975 | A1 * | 9/2021 | Hino | H02K 15/02 |
| 2022/0006334 | A1 * | 1/2022 | Wakisaka | H02K 1/06 |
| 2022/0294281 | A1 * | 9/2022 | Lust | H02K 1/148 |

FOREIGN PATENT DOCUMENTS

| | | |
|---|---|---|
| JP | 2006-296010 A | 10/2006 |
| JP | 2008-099473 A | 4/2008 |
| JP | 2010-011645 A | 1/2010 |
| JP | 2012-105388 A | 5/2012 |
| JP | 2018-074638 A | 5/2018 |
| WO | 2017/090137 A1 | 6/2017 |
| WO | 2019/087339 A1 | 5/2019 |

OTHER PUBLICATIONS

Office Action issued Aug. 19, 2023 in Chinese Application No. 201980100862.2.

Communication dated Nov. 22, 2022, issued in Japanese Application No. 2021-550830.

Japanese Office Action dated Feb. 7, 2023 in Japanese Application No. 2021-550830.

* cited by examiner

ELECTRIC ROTATING MACHINE WITH STATOR HAVING CORE BACK PORTIONS WITH WELDING PORTIONS

CROSS REFERENCE TO RELATED APPLICATIONS

This application is a National Stage of International Application No. PCT/JP2019/038844 filed on Oct. 2, 2019.

TECHNICAL FIELD

The present disclosure relates to an electric rotating machine.

BACKGROUND ART

An electric rotating machine having armature coils in a stator and magnetic-field poles in a rotor is well-known. When operating as a motor, an electric rotating machine of this type generates a rotating magnetic field in the stator by means of AC electric power supplied to the armature coils, so that the rotor is rotated. The stator of the electric rotating machine is provided with a stator iron core in which there are formed many slots for containing respective coil conductors of the armature coils. The stator iron core is configured in such a way that there are circularly aligned two or more division cores that are each formed by stacking up two or more thin-plate electromagnetic steel plates, each of which is punched in a predetermined shape, or in such a way that two or more thin-plate electromagnetic steel plates, each of which is preliminarily punched in a circular and integral shape, are stacked.

The foregoing stator iron core is formed in such a way that two or more stacked electromagnetic steel plates are integrally fixed with one another by means of, for example, blanking-type crimping (the steel plates are hit with a die and then crimped together), an adhesive, or the like. The ring-shaped stator iron core formed in such a manner is shrink-fitted or press-fitted into the inner circumferential surface of the stator housing so as to be fixed thereto. The rotor 23 fixed on the shaft is inserted into a central space portion provided in the stator iron core. The shaft is pivotably supported by the rotor housing through the intermediary of bearings.

As described above, the stator iron core is formed by stacking up thin-plate electromagnetic steel plates; therefore, when the stator iron core is fixed to the inner circumferential surface of the housing by means of shrink-fitting or press-fitting, there exists a probability that fastening stress exerted on the stator iron core by the housing causes a phenomenon, for example, that the stress concentration portion of the stator iron core is deformed by buckling or that the electromagnetic steel plate at the stacking-direction end portion is separated. In particular, in the case of the stator iron core formed by aligning the two or more division cores in a ring-shaped manner, the probability is raised. Moreover, in the case where a flange for fixing the electric rotating machine to a vehicle structure is mounted in the housing, there exists a probability that a portion at which compression stress partly concentrates is formed in the housing and hence the stator iron core fixed to the inside of the housing is deformed.

Patent Document 1 discloses an electric rotating machine in which a reinforced portion made by welding extending in the stacking direction of the stator iron core is provided at the position, of the stator iron core, that corresponds to the flange of the housing so that the steel plates included in the stator iron core are suppressed from being deformed. In addition, Patent Document 2 discloses an electric rotating machine in which respective fastening stress suppression plates are provided at the both stacking-direction end portions of the stator iron core so that when the stator iron core is shrink-fitted or press-fitted into the housing, the fastening stress exerted on the stator iron core is suppressed.

PRIOR ART REFERENCE

Patent Document

[Patent Document 1] Japanese Patent Application Laid-Open No. 2012-105388
[Patent Document 2] Japanese Patent Application Laid-Open No. 2006-296010

DISCLOSURE OF THE INVENTION

Problems to be Solved by the Invention

In the conventional electric rotating machine disclosed in Patent Document 1, it is made possible to suppress the stator iron core from being deformed; however, for example, in the case where a reinforced portion, formed by applying welding to all parts of the electromagnetic steel plates in the stacking-direction thereof, is provided in the stator iron core, short-circuiting among the two or more electromagnetic steel plates, caused by the welding, increases iron loss and hence the efficiency of the electric rotating machine may be deteriorated. Moreover, in the case where a reinforced portion, formed by applying welding to all parts of the electromagnetic steel plates in the stacking-direction thereof, is provided at the core-back portion of the stator iron core, the stacked electromagnetic steel plates situated at the respective radial-direction front ends of the tooth portions in the stator iron core separate from one another due to reactive force of the welded reinforced portion, and hence an increase in noise or vibration may be caused.

In addition, in the conventional electric rotating machine disclosed in Patent Document 2, the respective fastening stress suppression plates are provided at the both stacking-direction end portions of the stator iron core, so that the stator iron core can be suppressed from being deformed; however, not only an increase in the material cost is caused by an increase in the number of components, but also the production cost increases because the number of manufacturing processes for mounting the fastening stress suppression plates increases; thus, the conventional electric rotating machine becomes high-cost.

The present disclosure discloses a technology for solving the foregoing problems in the conventional electric rotating machines; the objective thereof is to provide a high-efficiency and low-cost electric rotating machine.

Means for Solving the Problems

An electric rotating machine disclosed in the present disclosure includes
 a housing,
 a stator iron core that includes two or more stacked electromagnetic steel plates and has a core-back portion and tooth portions each extending from the core-back portion toward a radially inside thereof, and a rotor that is disposed at the radially inside of the stator iron core and is pivotably supported by a stator having the stator iron core; the electric rotating machine is characterized in that the stator iron core is fixed to the housing through shrink-fitting or press-fitting, in that the core-back portion has a welding portion that extends from a stacking-direction end portion along the stacking direction so as to ride on the two or more electromagnetic steel plates, and in that the welding portion is provided partly between the both stacking-direction end portions of the core-back portion.

In addition, an electric rotating machine disclosed in the present disclosure includes a housing, a stator iron core that includes two or more stacked electromagnetic steel plates and has a ring-shaped core-back portion and tooth portions each extending from the core-back portion toward a radially inside thereof, and a rotor that is disposed at the radially inside of the stator iron core and is pivotably supported by a stator having the stator iron core; the electric rotating machine is characterized in that the stator iron core is fixed to the housing through shrink-fitting or press-fitting, in that the core-back portion has a welding portion that continuously extends along the stacking direction between the stacking-direction both end portions so as to ride on the two or more electromagnetic steel plates, and in that the welding portion is formed in such a way that a width of a part thereof situated at each of the both end portions is larger than a width of a part thereof situated at the stacking-direction central portion.

Advantage of the Invention

In an electric rotating machine disclosed in the present disclosure, the core-back portion has a welding portion that extends from a stacking-direction end portion along the stacking direction so as to ride on the two or more electromagnetic steel plates, and the welding portion is provided partly between the both stacking-direction end portions of the core-back portion; therefore, a high-efficiency and low-cost electric rotating machine can be obtained.

In addition, in an electric rotating machine disclosed in the present disclosure, the core-back portion of the stator iron core has a welding portion that continuously extends along the stacking direction between the stacking-direction both end portions so as to ride on the two or more electromagnetic steel plates, and the welding portion is formed in such a way that a width of a part thereof situated at each of the both end portions is larger than a width of a part thereof situated at the stacking-direction central portion; therefore, a high-efficiency and low-cost electric rotating machine can be obtained.

BEST MODE FOR CARRYING OUT THE INVENTION

Embodiment 1

Figure 1:
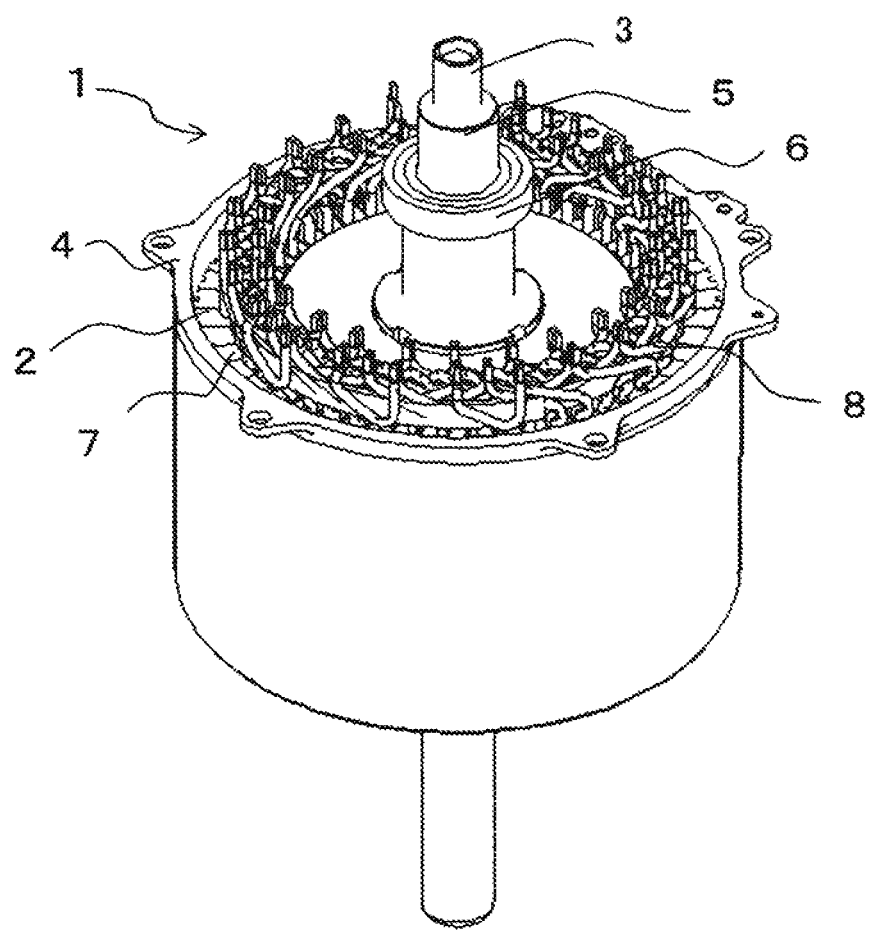
FIG. 1 is a perspective view illustrating the configuration of an electric rotating machine according to Embodiment 1.
Figure 2:
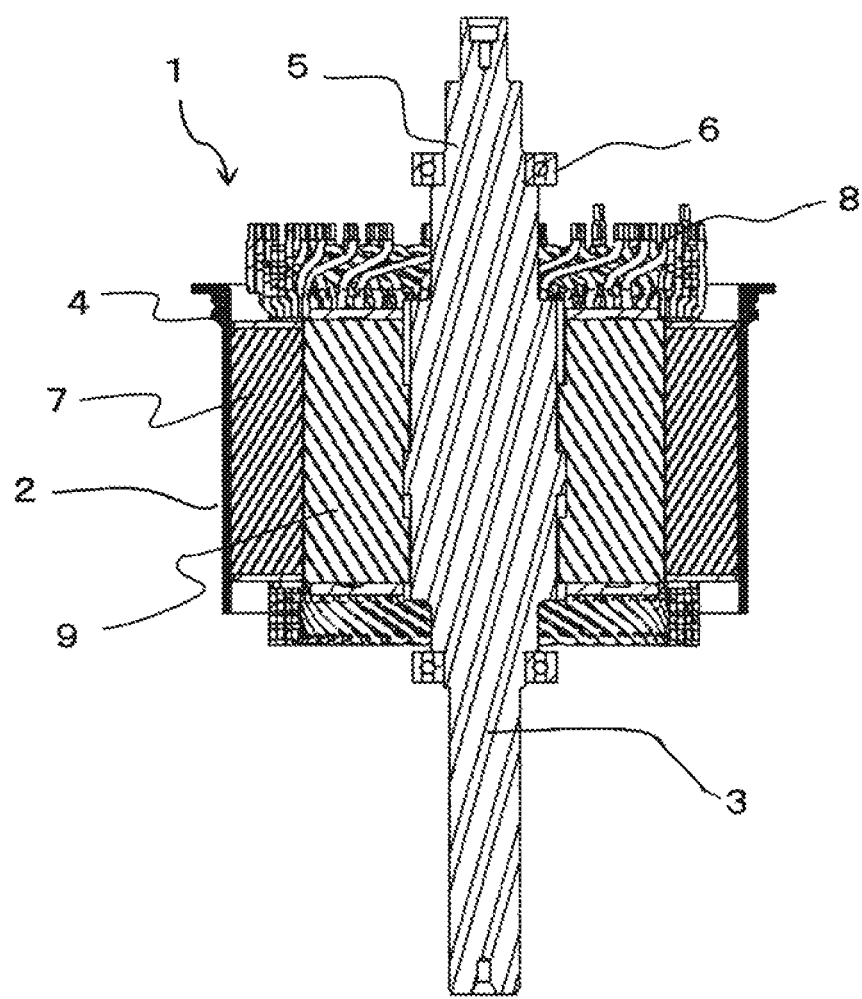
FIG. 2 is a cross-sectional view illustrating the configuration of the electric rotating machine according to Embodiment 1.
Figure 3:
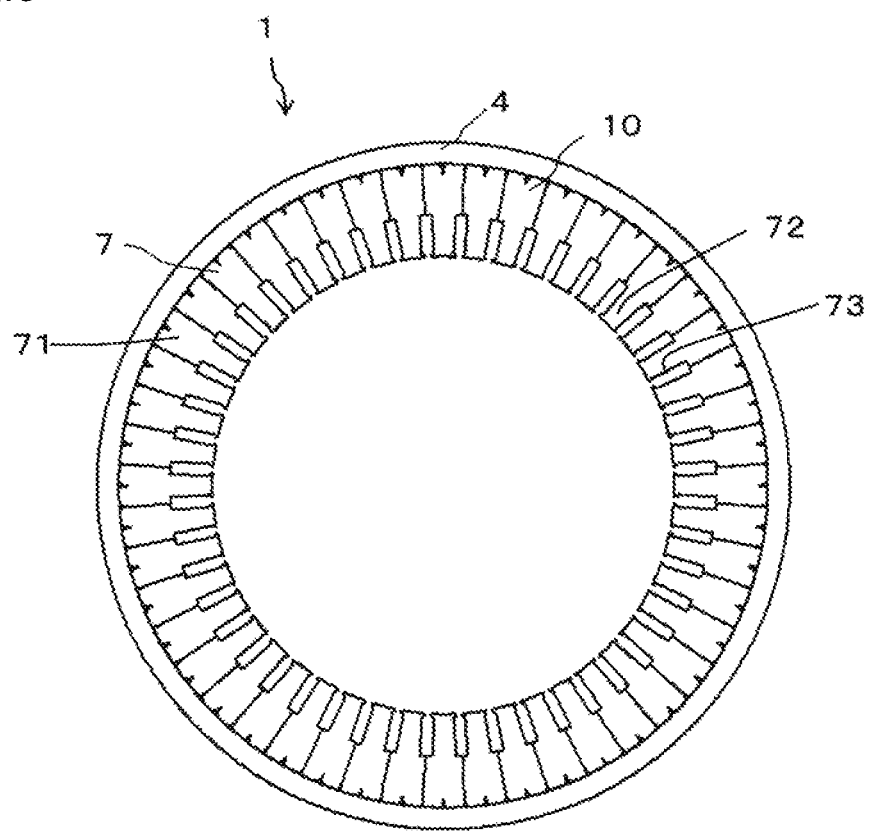
FIG. 3 is a plan view illustrating a stator iron core and a housing in the electric rotating machine according to Embodiment 1.

An electric rotating machine according to Embodiment 1 will be explained with reference to the drawings. FIG. 1 is a perspective view illustrating the configuration of an electric rotating machine according to Embodiment 1; FIG. 2 is a cross-sectional view illustrating the configuration of the electric rotating machine according to Embodiment 1; FIG. 3 is a plan view illustrating a stator iron core and a housing in the electric rotating machine according to Embodiment 1. In FIGS. 1, 2, and 3, an electric rotating machine 1 has a stator 2 and a rotor 3. The stator 2 has a stator iron core 7 formed by aligning two or more division cores 10 in a ring-shaped manner, a housing 4 formed in the shape of a cylindrical tube, stator coils 8, as armature coils, that are mounted in the stator iron core 7, and a pair of brackets (unillustrated).

As well illustrated in FIG. 3, the stator iron core 7 formed by aligning the two or more division cores 10 in a ring-shaped manner has core-back portions 10a and two or more teeth 72 that each extend from the core-back portions 10a toward the radially inside. The stator iron core 7 formed in the shape of a ring is fixed to the housing 4 through shrink-fitting of press-fitting in such a way that the outer circumferential portion of the core-back portion 71 thereof abuts on the inner circumference portion of the housing 4. The cross section of a coil conductor included in the stator coil 8 is formed in the shape of a rectangle or a circle. This coil conductor is inserted into a slot 73 formed between adjacent teeth 72 of the stator iron core 7.

The rotor 3 is pivotably supported by the pair of brackets (unillustrated) of the stator 2 through the intermediary of bearings 6 fixed on a shaft 5. The rotor 3 has a rotor iron core 9 fixed to the shaft 5 through press-fitting or the like. The rotor iron core 9 includes stacked electromagnetic steel plates that are each formed in the shape of a thin plate, and has two or more permanent magnets (unillustrated) contained in respective holes penetrating the outer circumferential portion thereof in the stacking direction of the electromagnetic steel plates. The two or more permanent magnets are arranged at equal intervals in the circumferential direction of the rotor iron core 9; each of the permanent magnets forms a magnetic-field pole.

In the electric rotating machine 1 configured in such a manner as described above, when, for example, three-phase AC electric power is supplied to the stator coil 8, a rotating magnetic field is generated in the stator 2; then, the rotor 3 is rotated by interaction between the rotating magnetic field and magnetic flux lines generated by the magnetic-field poles provided in the rotor 3.

Figure 4:
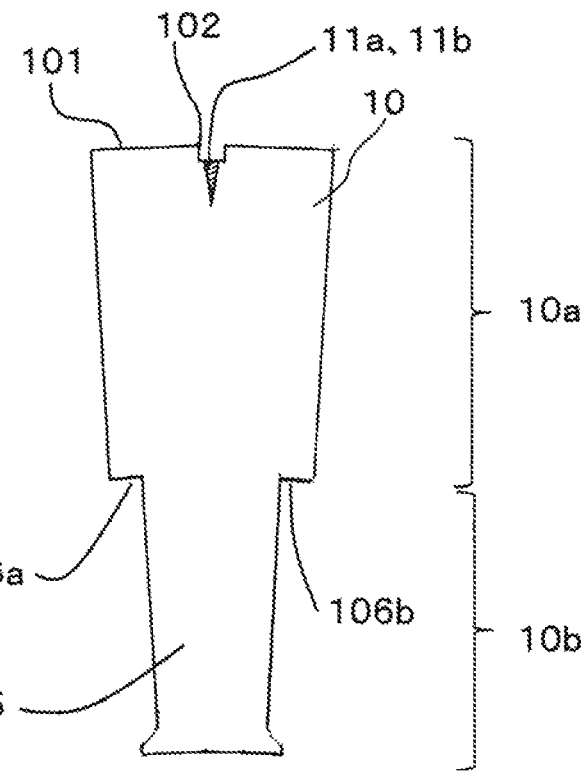
FIG. 4 is a plan view illustrating a division core included in the stator iron core in the electric rotating machine according to Embodiment 1.
Figure 5:
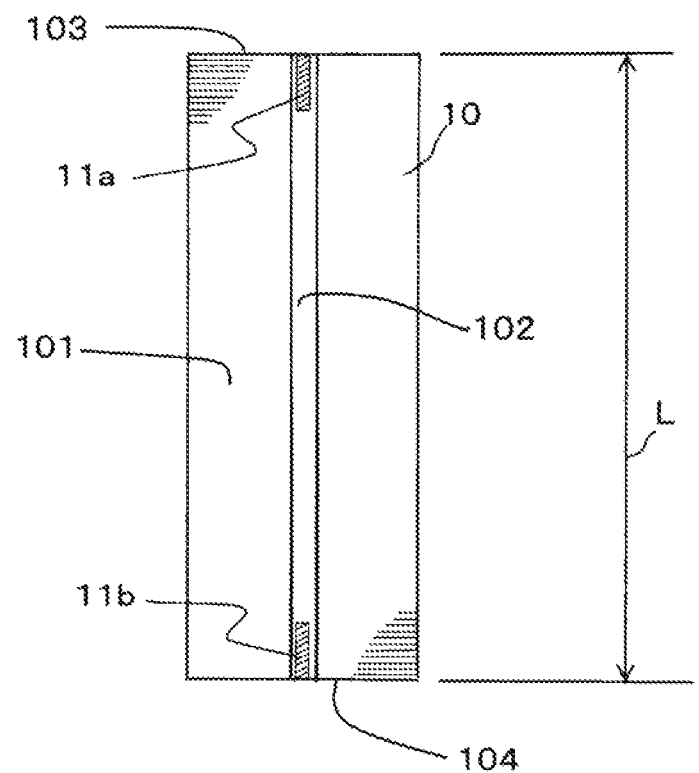
FIG. 5 is a side view illustrating the division core included in the stator iron core in the electric rotating machine according to Embodiment 1.

FIG. 4 is a plan view illustrating a division core included in the stator iron core in the electric rotating machine according to Embodiment 1; FIG. 5 is a side view illustrating a division core included in the stator iron core in the electric rotating machine according to Embodiment 1. In each of FIGS. 4 and 5, the stator iron core 7 of the stator 2 includes 48 pieces of the division cores 10 that are aligned in a ring-shaped manner. In this regard, however, the number of the division cores 10 included in the stator iron core 7 is not limited to 48.

Use of the division cores 10 in the stator iron core 7 raises the space factor of the stator coil 8 and the output density, so that it is made possible to raise the efficiency, to reduce the die cost, and to accelerate the winding work for winding the coil conductors. The division core 10 included in the stator iron core 7 is produced in the following manner. That is to say, at first, an electromagnetic steel plate having a thickness of substantially 0.2 [mm] through 0.5 [mm] is blanked through press working so that an electromagnetic steel plate for a division core is formed. Next, two or more electromagnetic steel plates for a division core are stacked up in the plate-thickness direction thereof, so that a stacked block is formed. Then, the stacked block is hit with a die in the stacking direction, i.e., so-called "blanking-type crimping" is applied to the stacked block, or the stacked block is painted with an adhesive, so that the two or more stacked electromagnetic steel plates for a division core are integrally fixed to one another; as a result, a single division core 10 is produced.

The division core 10 has a shape including the core-back portion 10a and a tooth portion 10b. The tooth portion 10b has a single tooth 105; at the both sides of the tooth 105, there are formed cutting portions 106a and 106b for forming slots along with respective adjacent division cores 10. A U-shaped groove 102 extending in the stacking direction of the electromagnetic steel plates is formed at the radially outmost portion of the core-back portion 10a in the division core 10 illustrated in FIG. 5, i.e., at the outer circumferential portion 101 of the core-back portion 10a. Each of a first welding portion 11a and a second welding portion 11b is formed at the bottom portion of the U-shaped groove 102. In the following explanation, the first welding portion 11a and the second welding portion 11b provided at the same position in the circumferential direction of the stator iron core 7 will generically and simply be referred to as a "welding portion". In Embodiment 1, the number of the welding portions is 48.

Each of the first welding portion 11a and the second welding portion 11b are partly provided between the stacking-direction both end portions of the core-back portion 10a. That is to say, as illustrated in FIG. 5, the first welding portion 11a is formed in such a way as to be welded in the stacking direction in a range extending at least 1[%] of the axial length L of the division core 10 from one stacking-direction end portion 103 of the electromagnetic steel plates. The second welding portion 11b is formed in such a way as to be welded in the stacking direction in a range extending at least 1[%] of the axial length L of the division core 10 from the other stacking-direction end portion 104 of the electromagnetic steel plates. As described above, the first welding portion 11a and the second welding portion 11b that are provided at the same position in the circumferential direction of the division core 10 are separated from each other in the stacking direction.

The outer diameter of the stator iron core 7 is set to be larger than the inner diameter of the cylindrical tubular housing 4; for example, an interference of substantially 0.1 [mm] through 0.4 [mm] is provided to the stator iron core 7. The stator iron core 7 is inserted into the housing 4 through an assembling method such as shrink-fitting or press-fitting and is fixed to the housing 4 in such a way that the outer circumferential portion of the stator iron core 7 abuts against the inner circumference portion of the housing 4. In this situation, because press-in stress caused by the interference provided to the stator iron core 7 exerts radially-outside fastening stress on the stator iron core 7; concurrently, because the division cores 10 are aligned in a ring-shaped manner, the portion where the adjacent division cores 10 abut on each other receives circumferential-direction reactive force.

In this situation, because as the plate-thickness of the electromagnetic steel plate is thinner, the rigidity of the division core 10, which is a laminated body of the electromagnetic steel plates, decreases, the division core 10 becomes liable to be buckled by the circumferential-direction reactive force; thus, there is posed a problem in promoting thinning of the electromagnetic steel plate in order to raise the performance of the electric rotating machine 1. Moreover, in the case where although the layers are fixed to each other by means of blanking-type crimping of an adhesive, the circumferential-direction reactive force is larger than the bonding strength between the layers or the effect of vibration or heat at a time of operation of the electric rotating machine 1 deteriorates the bonding strength between the layers in the division core 10, the division core 10 cannot withstand the circumferential-direction reactive force and hence may be buckled and deformed.

When the stator iron core 7 is shrink-fitted or press-fitted into the housing 4, circumferential-direction reactive force is produced at the portion where the division cores 10 abut on each other; this reactive force exerts buckling and deforming force on the division core 10. However, in the electric rotating machine according to Embodiment 1 of the present disclosure, the high-rigidity first welding portion 11a and second welding portion 11b that are provided in such a way as to extend in the stacking direction from the one stacking-direction end portion 103 and the other stacking-direction end portion 104, respectively, suppress the buckling and deforming force; therefore, buckle and deformation are caused neither in the division core 10 nor in the stator iron core 7.

When the stator iron core 7 is shrink-fitted or press-fitted into the housing 4, the fastening stress becomes large, especially at the respective portions, of the housing 4, that each make contact with the one end portion 103 and the other end portion 104, which are the both stacking-direction end portions of the division core 10. Thus, the rigidity of the division core 10 can be raised by providing the first welding portion 11a and the second welding portion 11b at the one end portion 103 and the other end portion 104, respectively, of the division core 10, that correspond to the respective portions where the stress becomes especially large.

In the foregoing electric rotating machine according to Embodiment 1, even when the reactive force exerted in the circumferential direction of the division core 10 is larger than the crimping strength between the layers or the bonding strength of the adhesive, the division core can be suppressed from being deformed due to buckling or the end portions of the division core can be suppressed from being turned up. Moreover, the configuration according to Embodiment 1 makes it possible that even when the electromagnetic steel plate is made thinner, the welding portions provided at the respective peripheries of the both stacking-direction end portions suppress the electromagnetic steel plate from being deformed; therefore, a high-performance electric rotating machine can be provided.

Moreover, because the welding positions are limited to the respective peripheries of the both stacking-direction end portions, the effect of eddy-current loss due to short-circuiting between the layers, caused by welding, can be suppressed. Furthermore, because the welding can suppress the electromagnetic steel plates from separating from one another at the teeth portion 10b of the division core 10, it is made possible to provide an electric rotating machine that is high-efficient and in which noise and vibration are small.

In addition, the respective welding ranges from the both stacking-direction end portions are determined by the interference between the housing 4 and the division core 10. The interference is set within an extent where the buckling load on the division core 10 can be suppressed.

Embodiment 2

Figure 6:
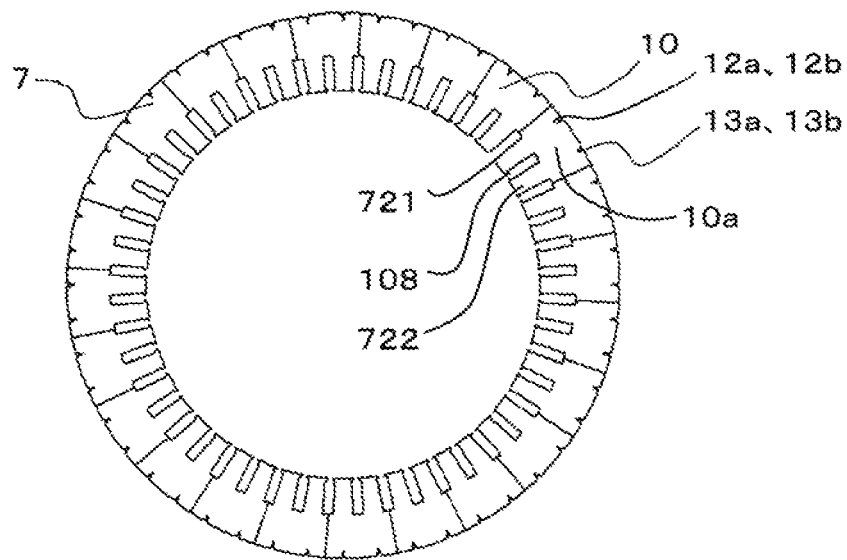
FIG. 6 is a plan view illustrating a stator iron core in an electric rotating machine according to Embodiment 2.
Figure 7:
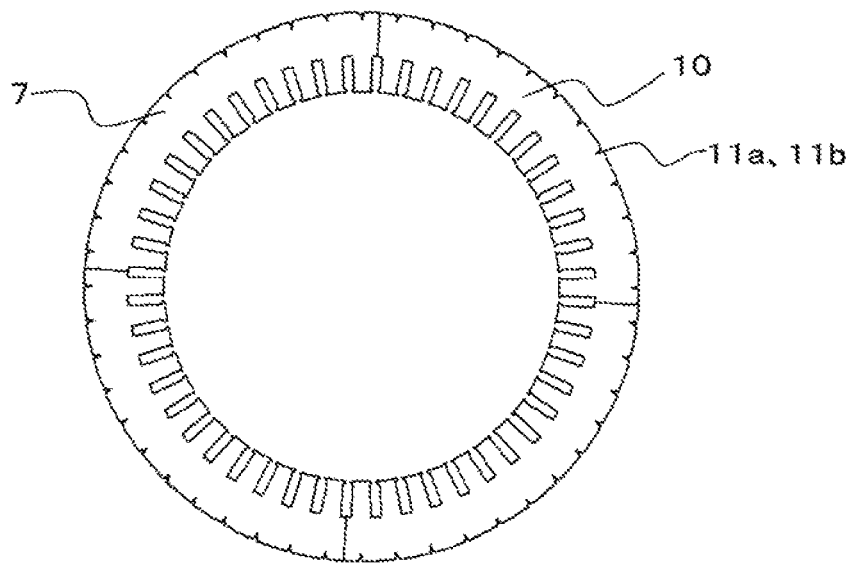
FIG. 7 is a plan view illustrating a variant example of the stator iron core in the electric rotating machine according to Embodiment 2.

Next, an electric rotating machine according to Embodiment 2 will be explained with reference to the drawings. FIG. 6 is a plan view illustrating a stator iron core in an electric rotating machine according to Embodiment 2. FIG. 7 is a plan view illustrating the stator iron core in the electric rotating machine according to Embodiment 2. The overall configuration of the electric rotating machine according to Embodiment 2 is the same as that represented in each of FIGS. 1 and 2. The stator iron core 7 of the electric rotating machine 1 according to Embodiment 2 is formed of 24 pieces of division cores 10 aligned in a ring-shaped manner.

The tooth portion 10b of the division core 10 according to Embodiment 1 represented in FIG. 4 has a single tooth 105; however, as illustrated in FIG. 6, the tooth portion 10b of the division core 10 according to Embodiment 2 includes two teeth 721 and 722, and a single slot 108 is formed between the two teeth 721 and 722. A pair of a first welding portion 12a and a second welding portion 12b and a pair of a third welding portion 13a and a fourth welding portion 13b are provided at the respective circumferential surface portions of the core-back portion 10a corresponding to the two teeth 721 and 722. In the following explanation, the pair of the first welding portion 12a and the second welding portion 12b and the pair of the third welding portion 13a and the fourth welding portion 13b that are each provided at the same position in the circumferential direction of the stator iron core 7 will generically and simply be referred to as a "welding portion". A single division core 10 is provided with two welding portions; 48 pieces of welding portions are provided in the overall stator iron core 7.

The first welding portion 12a is formed in such a way as to be welded in the stacking direction in a range extending at least 1[%] of the axial length of the division core 10 from one stacking-direction end portion of the electromagnetic steel plates. The second welding portion 12b is welded in the stacking direction in a range extending at least 1[%] of the axial length of the division core 10 from the other stacking-direction end portion of the electromagnetic steel plates. As described above, the first welding portion 12a and the second welding portion 12b are provided in such a way as to be separated from each other in the stacking direction.

Similarly, the third welding portion 13a is formed in such a way as to be welded in the stacking direction in a range extending at least 1[%] of the axial length of the division core 10 from one stacking-direction end portion of the electromagnetic steel plates. The fourth welding portion 13b is welded in the stacking direction in a range extending at least 1[%] of the axial length of the division core 10 from the other stacking-direction end portion of the electromagnetic steel plates. As described above, the third welding portion 13a and the fourth welding portion 13b are provided in such a way as to be separated from each other in the stacking direction.

In the electric rotating machine according to Embodiment 2, as is the case with Embodiment 1, the welding portions provided at the radially outside, i.e., at the outer circumferential portion of the core-back portion make it possible to obtain the effect that deformation of the electromagnetic steel plate or turn-up of the end portion is suppressed. The number of the division cores may be four, as represented in FIG. 7; the number thereof is not limited thereto. In addition, the number of teeth in the division core and the number or the welding portions at the outer circumferential portion of the stator iron core 7 are not limited to the foregoing numbers.

Embodiment 3

Figure 8:
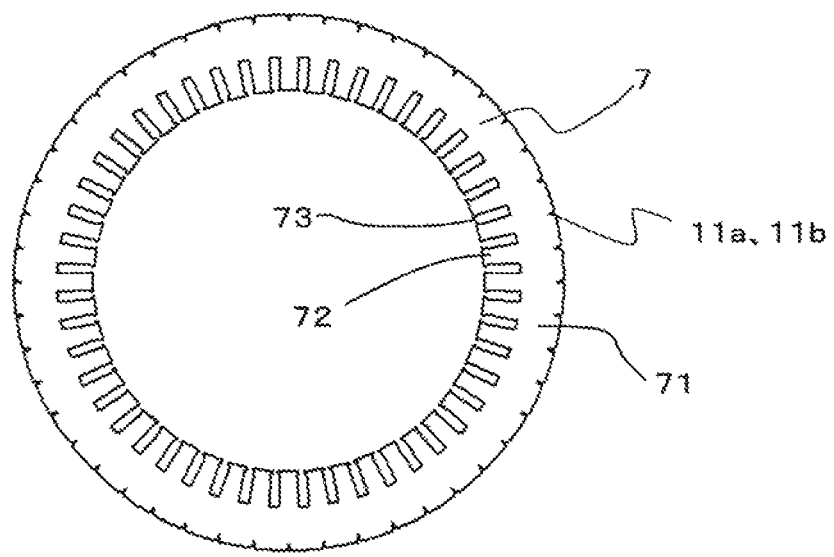
FIG. 8 is a plan view illustrating a stator iron core in an electric rotating machine according to Embodiment 3.

Next, an electric rotating machine according to Embodiment 3 will be explained with reference to the drawings. FIG. 8 is a plan view illustrating a stator iron core in the electric rotating machine according to Embodiment 3. The overall configuration of the electric rotating machine according to Embodiment 3 is the same as that represented in each of FIGS. 1 and 2. As illustrated in FIG. 8, the stator iron core 7 has two or more slots 73 and two or more teeth 72 in the inner circumference portion thereof and has an integral shape of a ring. Forty-eight pieces of welding portions are provided at the respective outer circumferential portions, corresponding to the teeth 72, of the core-back portion 71 in the stator iron core 7. Also in the following explanation, the first welding portion 11a and the second welding portion 11b provided at the same position in the circumferential direction of the stator iron core 7 will generically be referred to as a "welding portion".

As is the case with Embodiment 1, each of these welding portions includes the first welding portion 11a and the second welding portion 11b. The first welding portion 11a is formed in such a way as to be welded in the stacking direction in a range extending at least 1[%] of the axial length L of the stator iron core 7 from one stacking-direction end portion of the electromagnetic steel plates. The second welding portion 11b is formed in such a way as to be welded in the stacking direction in a range extending at least 1[%] of the axial length L of the stator iron core 7 from the other stacking-direction end portion of the electromagnetic steel plates. As described above, the first welding portion 11a and the second welding portion 11b are provided in such a way as to be separated from each other in the stacking direction.

Even in the case of the integral-shape stator iron core 7, when the plate thickness is small, the rigidity is small; thus, there exists a probability that when the stator iron core 7 is shrink-fitted or press-fitted into the housing 4, press-in stress deforms the electromagnetic steel plate or causes the core end portion to turn up. In the configuration according to Embodiment 3, as is the case with the configuration according to Embodiment 1, the welding portions provided at the outer circumferential portion of the core-back portion 71 make it possible to obtain the effect that deformation of the electromagnetic steel plate or turn-up of the end portion is suppressed.

Figure 9:
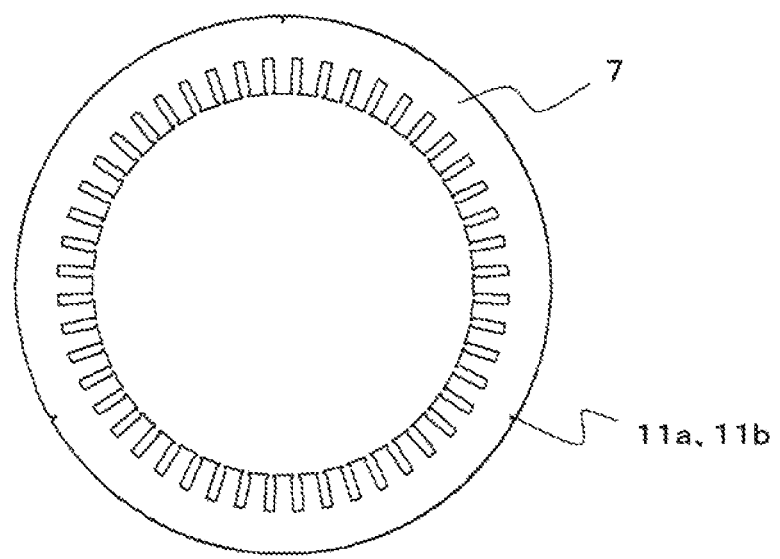
FIG. 9 is a plan view illustrating a variant example of the stator iron core in the electric rotating machine according to Embodiment 3.

FIG. 9 is a plan view illustrating a variant example of the stator iron core in the electric rotating machine according to Embodiment 3. As illustrated in FIG. 9, the number of provided welding portions is not 48, as illustrated in FIG. 8, but 3. Each of the welding portions in the variant example according to Embodiment 3 includes the first welding portion 11a and the second welding portion 11b. The first welding portion 11a is formed in such a way as to be welded in the stacking direction in a range extending at least 1[%] of the axial length L of the stator iron core 7 from one stacking-direction end portion of the electromagnetic steel plates. The second welding portion 11b is formed in such a way as to be welded in the stacking direction in a range extending at least 1[%] of the axial length L of the stator iron core 7 from the other stacking-direction end portion of the electromagnetic steel plates. As described above, the first welding portion 11a and the second welding portion 11b are provided in such a way as to be separated from each other in the stacking direction.

The number of the welding portions can freely be set in accordance with the foregoing interference at a time when the stator iron core 7 is shrink-fitted or press-fitted into the housing 4, so that the buckling load on the stator iron core 7 can be suppressed. Stress is caused at a welding position and the stress slightly affects the shape of the stator iron core 7; when the number of the welding portions coincides with the number N of the poles (N is an integer) of the electric rotating machine 1, the shape of the stator iron core 7 is deformed toward an N-polygonal shape. When the stator iron core 7 is deformed to an N-polygonal shape, pulsation in the N-order space permeance causes the electromagnetic exciting force of the electric rotating machine 1 to increase and hence vibration and noise of the electric rotating machine 1 may increase.

However, when the number of the welding portions is set to be different from the number N of the poles of the electric rotating machine 1, such electromagnetic exciting force can be suppressed from increasing; thus, there is obtained an effect that a low-vibration and low-noise electric rotating machine can be provided. More preferably, the number of the welding portions should be other than a divisor of the number N of the poles. The reason for that is that when the harmonic-wave components of the permeance pulsation are taken into consideration, it is desirable to avoid the case where a number that is integer-fold as large as the order of deformation coincide with the number N of the poles. When the case where the number of the poles of the electric rotating machine is 8, i.e., the case where N is 8 is considered, it is only necessary to avoid divisors of 8, i.e., 1, 2, 4. For example, as the number of the welding portions, 3, 5, 6, or the like are conceivable.

Embodiment 4

Figure 10:
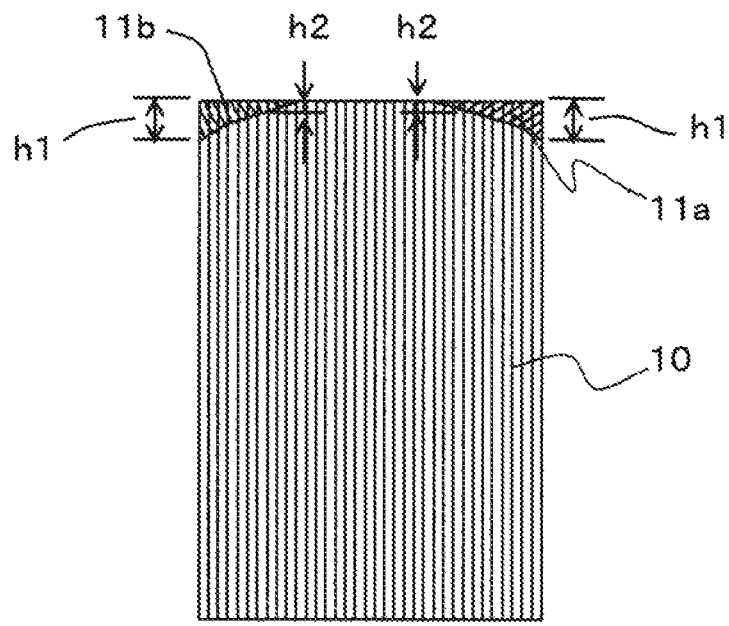
FIG. 10 is a cross-sectional view illustrating welding portions of a stator iron core in an electric rotating machine according to Embodiment 4.

FIG. 10 is a cross-sectional view illustrating welding portions of the stator iron core in an electric rotating machine according to Embodiment 4. The overall configuration of the electric rotating machine is the same as that represented in each of FIGS. 1 and 2. In Embodiment 4, the first welding portion 11a and the second welding portion lib, which are each provided in a range extending at least 1 [%] of the axial length L from the both respective stacking-direction end portions of the stator iron core 7, are formed in such a way that from each of the both stacking-direction end portions, the width h1 of the welding is larger than the width h2 of the welding, i.e., the width of the welding decreases as the position approaches the stacking-direction center of the stator iron core 7.

In Embodiment 4, because the rigidity of the both stacking-direction end portions, of the stator iron core 7, that are portions where the press-in stress of the housing 4 is largest is raised by widening the welding width, i.e., the welding range, deformation of the electromagnetic steel plate or turn-up of the end portion can be suppressed. Moreover, because by decreasing the welding width in the stacking direction, the effect of the eddy-current loss, due to stacking-direction short-circuiting caused by the welding, can be suppressed at positions other than the positions where the welding contributes to suppression of deformation or turn-up of the end portion, a high-efficiency electric rotating machine can be provided. In addition, it is desirable that the number of the welding portions is set in such a way as to avoid the number of the poles of the electric rotating machine and the divisors of the number of the poles; such a configuration makes it possible to suppress the electromagnetic exciting force from increasing.

Embodiment 5

Figure 11:
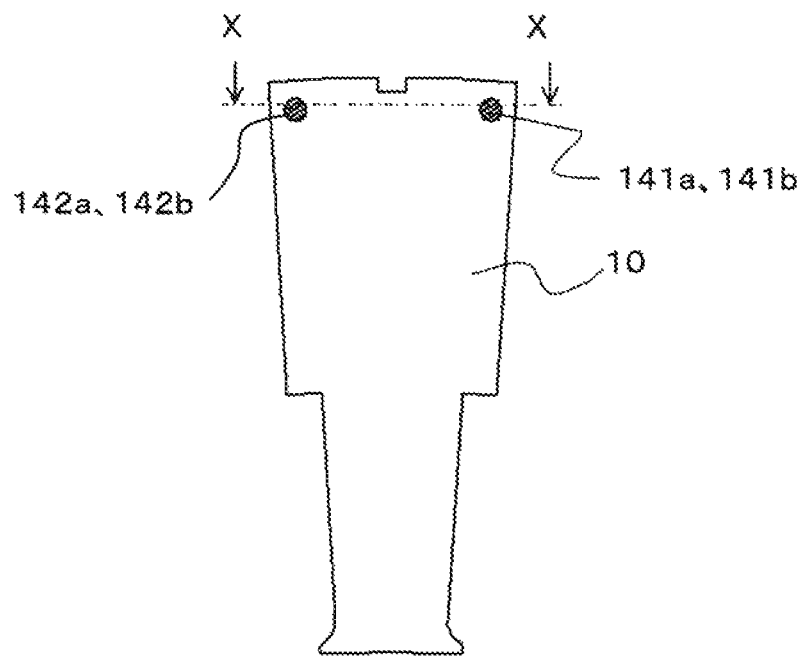
FIG. 11 is a plan view illustrating a division core included in a stator iron core in an electric rotating machine according to Embodiment 5.
Figure 12:
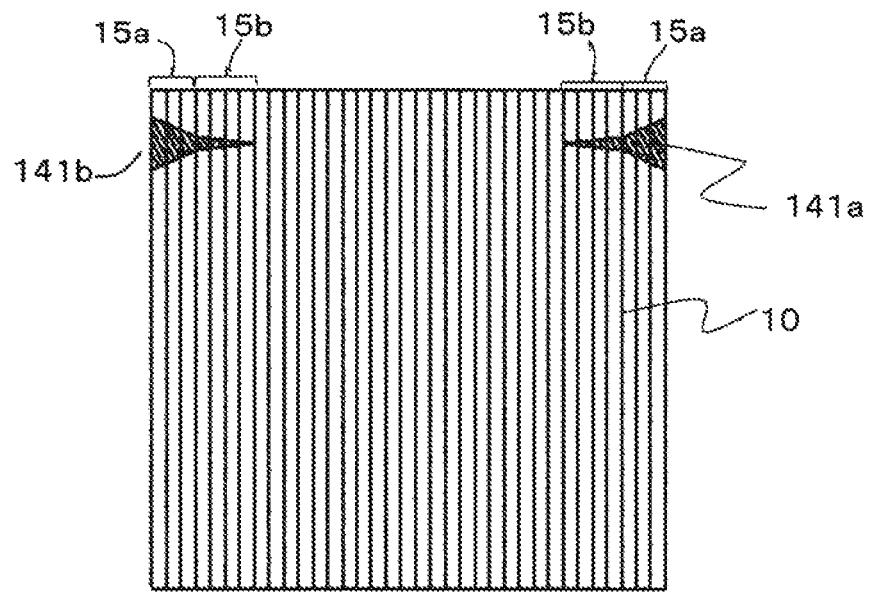
FIG. 12 is a cross-sectional view illustrating welding portions of a division core included in the stator iron core in the electric rotating machine according to Embodiment 5.

FIG. 11 is a plan view illustrating a division core included in a stator iron core in an electric rotating machine according to Embodiment 5; FIG. 12 is a cross-sectional view illustrating welding portions of the division core included in the stator iron core in the electric rotating machine according to Embodiment 5; FIG. 12 is a cross-sectional view taken along the line X-X in FIG. 11. The overall configuration of the electric rotating machine is the same as that represented in each of FIGS. 1 and 2. In the electric rotating machine according to Embodiment 5, there are provided a pair of a first welding portion 141a and a second welding portion 141b and a pair of a third welding portion 142a and a fourth welding portion 142b that each penetrate the core-back portion of the division core 10 in the stacking direction of the electromagnetic steel plates.

The first welding portion 141a is formed in such a way as to be welded from one stacking-direction end portion of the electromagnetic steel plates toward the stacking-direction center of the division core 10; the second welding portion 141b is formed in such a way as to be welded from the other stacking-direction end portion of the electromagnetic steel plates toward the stacking-direction center of the division core 10. The first welding portion 141a and the second welding portion 141b are provided at the same position in the circumferential direction of the division core 10 and are provided in such a way as to be separated from each other in the stacking direction.

Similarly, the third welding portion 142a is formed in such a way as to be welded from one stacking-direction end portion of the electromagnetic steel plates toward the stacking-direction center of the division core 10; the fourth welding portion 142b is formed in such a way as to be welded from the other stacking-direction end portion of the electromagnetic steel plates toward the stacking-direction center of the division core 10. The third welding portion 142a and the fourth welding portion 142b are provided at the same position in the circumferential direction of the division core 10 and are provided in such a way as to be separated from each other in the stacking direction. The circumferential-direction position of the division core 10, at which the pair of the first welding portion 141a and the second welding portion 141b are provided, is different from the circumferential-direction position of the division core 10, at which the pair of the third welding portion 142a and the fourth welding portion 142b are provided.

As illustrated in FIG. 12, each of the first welding portion 141a, the second welding portion 141b, the third welding portion 142a, and the fourth welding portion 142b has a first gradient portion 15a that is formed in such a way that the welding width thereof decreases as the position approaches the stacking-direction center from corresponding one of one stacking-direction end portion and the other stacking-direction end portion and a second gradient portion 15b having a gradient angle different from the gradient angle of the first gradient portion.

In Embodiment 5, because as the position approaches either one of the one stacking-direction end portion and the other stacking-direction end portion of the stator iron core 7, the welding width becomes wider and hence the rigidity of the welding portion is raised, deformation of the stator iron core 7 or turn-up of the end portion can be suppressed when the stator iron core 7 is shrink-fitted or press-fitted into the housing 4.

It may be allowed that the stator iron core 7 is integrally formed in the shape of a ring represented in Embodiment 3. This configuration can also demonstrate an effect the same as that in Embodiment 3.

In addition, in each of Embodiments 4 and 5, there has been explained an example in which the welding portion are partly provided in the stacking direction and the welding width is formed in such a way as to decrease as the position approached the stacking-direction center from either one of the one stacking-direction end portion and the other stacking-direction end portion; however, even in the case where the welding portion is formed in the stacking-direction overall length of the division core, there can be demonstrated the effect obtained by forming the welding portion in such a way as to decrease as the position approached the stacking-direction center from either one of the one stacking-direction end portion and the other stacking-direction end portion. In particular, when in the stacking-direction central portion, the width of the welding portion is formed to be very small, the adverse effect at a time when welding is applied to the stacking-direction overall length, i.e., an increase in the iron loss, deterioration of the efficiency of the electric rotating machine, and increases in noise and vibration due to separation between the layers at the teeth side can be suppressed to a minimum. In other words, the configuration of each of Embodiments 4 and 5 can be changed to the configuration in which the welding portion is formed in the stacking-direction overall length of the division core 10.

Embodiment 6

Figure 13:
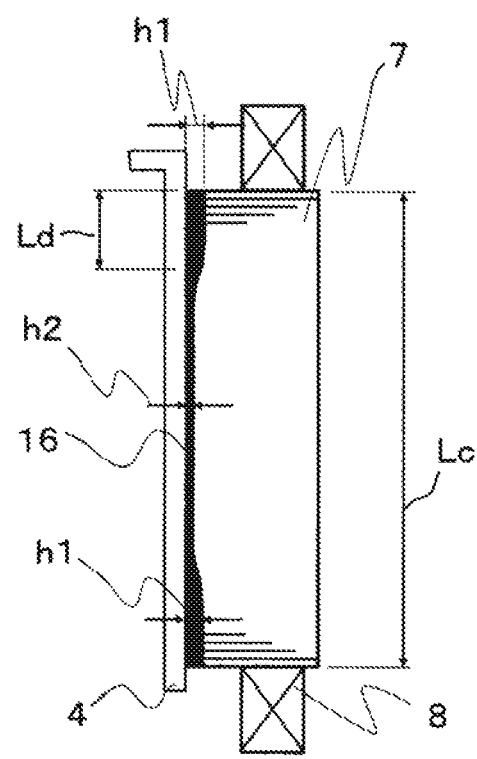
FIG. 13 is a cross-sectional view illustrating welding portions of the stator iron core in an electric rotating machine according to Embodiment 6.

FIG. 13 is a cross-sectional view illustrating welding portions of the stator iron core in an electric rotating machine according to Embodiment 6. The overall configuration of the electric rotating machine is the same as that represented in each of FIGS. 1 and 2. The configuration according to Embodiment 4 is changed to the one in which the welding portion is formed in the stacking-direction overall length of the division core, so that the configuration according to Embodiment 6 is obtained. In FIG. 13, a welding portion 16 provided from the stacking-direction both end portions of the stator iron core 7 is formed in such a way that the width of the welding portion 16 decreases as the position approaches the stacking-direction center from each of the stacking-direction both end portions and hence the equation related to the width [h1>h2] is established.

Moreover, the welding portion 16 is formed in the stacking-direction overall length of the division core 10. The welding portion 16 is provided continuously in the stacking direction in such a way that the width thereof at the stacking-direction central part is smaller than a welding width h1 at each of the both end portions.

Letting Lc denote the axial length, the length Ld of the welding portion, at each of the both end portions, that has a welding width of h1 is set, for example, to be the same as or smaller than (Lc×0.1).

Because in the configuration according to Embodiment 6, the stacking-direction both end portions of the stator iron core 7 including thin-plate and low-rigidity electromagnetic steel plates are welded, the rigidity at each of the both end portions is raised; therefore, the welding portion 16 having a raised rigidity can suppress buckling deformation of the stator iron core 7 and turn-up of the end portion, caused by fastening stress that is produced when the stator iron core 7 of the electric rotating machine is shrink-fitted or press-fitted into the housing 4. Moreover, in the welding portion 16, the region where the welding width is h1, required for securing the rigidity of the both end portions, is limited, and the welding width is decreased in the stacking-direction overall length in the region other than the end portions; as a result, there can be provided a low-noise and small-vibration electric rotating machine that suppresses iron loss from increasing and the layers at the tooth-front-end portions from separating from one another. In particular, because in the stacking-direction central portion, the width of the welding portion is formed to be very small, the adverse effect at a time when welding is applied to the stacking-direction overall length, i.e., an increase in the iron loss, deterioration of the efficiency of the electric rotating machine, and increases in noise and vibration due to the separation between the layers at the teeth side can be suppressed to a minimum.

In Embodiment 6, it may be allowed that the welding portion is provided in such a way as to penetrate the core-back portion in the stacking direction. In addition, it may be allowed that the stator iron core is configured in such a way that two or more division cores each including two or more stacked electromagnetic steel plates are aligned in a ring-shaped manner, that the division core has the core-back portion and a single tooth portion, and that the welding portion is provided every two or more division cores.

Moreover, it may be allowed that the stator iron core is configured in such a way that two or more division cores each including two or more stacked electromagnetic steel plates are aligned in a ring-shaped manner, that the division core has the core-back portion and two or more tooth portions, and that the welding portion is provided every two or more division cores. In addition, it may be allowed that the stator iron core is configured by stacking two or more electromagnetic steel plates that are each integrally formed in a ring-shaped manner.

Moreover, it may be allowed that there are provided two or more welding portions of which the number is a different from the number of poles of the electric rotating machine. Furthermore, it may be allowed that there are provided two or more welding portions of which the number is a different from any divisor of the number of poles of the electric rotating machine. Moreover, it may be allowed that an inter-core welding portion is provided on the outer circumferential portion of a core-back portion corresponding to the space between the adjacent division cores.

Embodiment 7

Figure 14:
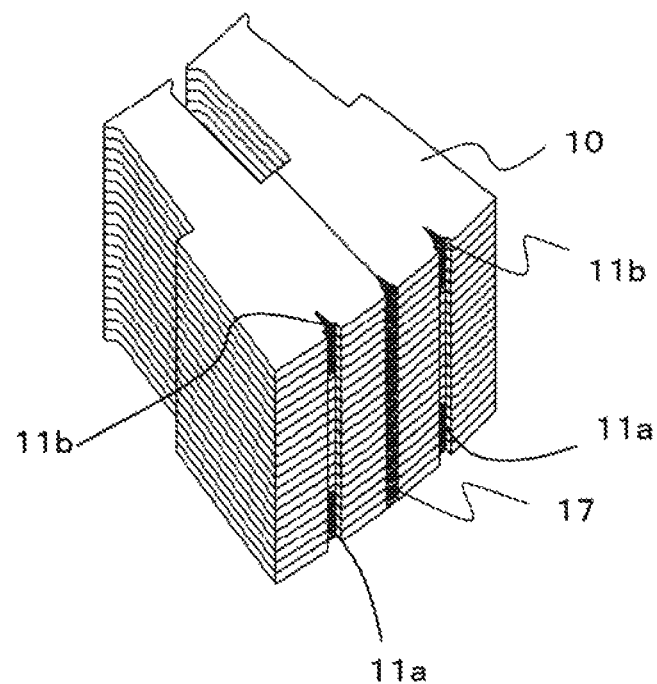
FIG. 14 is a perspective view illustrating a stator iron core in an electric rotating machine according to Embodiment 7.

FIG. 14 is a perspective view illustrating a stator iron core in an electric rotating machine according to Embodiment 7. In FIG. 14, as is the case with Embodiment 1, a U-shaped groove 102 extending in the stacking direction of the electromagnetic steel plates is formed at the radially outmost portion of the core-back portion 10a in the division core 10, i.e., at the outer circumferential portion of the core-back portion 10a. Each of a first welding portion 11a and a second welding portion 11b is formed at the bottom portion of the U-shaped groove 102.

As illustrated in FIG. 14, the first welding portion 11a is formed in such a way as to be welded in the stacking direction in a range extending at least 1[%] of the axial length L of the division core 10 from one stacking-direction end portion of the electromagnetic steel plates. The second welding portion 11b is welded in the stacking direction in a range extending at least 1[%] of the axial length of the division core 10 from the other stacking-direction end portion of the electromagnetic steel plates. As described above, the first welding portion 11a and the second welding portion 11b are provided in such a way as to be separated from each other in the stacking direction.

The division cores 10 each of which is formed as described above are aligned in a ring-shaped manner and included in the stator iron core 7; in Embodiment 7, after the two or more division cores 10 are aligned in a ring-shaped manner, an inter-core welding portion 17 is provided on the radially outside of the core-back portion 10a between the adjacent division cores 10.

In Embodiment 7, the inter-core welding portion 17 provided between the adjacent division cores 10 raises the rigidity of the stator iron core 7; therefore, even when the foregoing interference is large, deformation at a time of shrink-fitting or press-fitting or turn-up of the end portion can be suppressed. Furthermore, because the interference can be set to a large value, the respective tolerances of the inner diameter of the housing 4 and the outer diameter of the stator iron core 7 can be eased, and hence the cost can be suppressed from increasing. The inter-core welding portion 17 may be provided over all of or part of the stacking-direction shaft length.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. Therefore, an infinite number of unexemplified variant examples are conceivable within the range of the technology disclosed in the present application. For example, there are included the case where at least one constituent element is modified, added, or omitted and the case where at least one constituent element is extracted and then combined with constituent elements of other embodiments.

INDUSTRIAL APPLICABILITY

The present disclosure can be utilized not only in the field of an electric rotating machine but also in the field of an automobile utilizing an electric rotating machine.

DESCRIPTION OF REFERENCE NUMERALS

1: electric rotating machine
2: stator
3: rotor
4: housing
5: shaft
6: bearing
7: stator iron core
8: stator coil
9: rotor iron core
10: division core
10a, 71: core-back portion
10b: tooth portion
72, 721, 722: tooth
73, 108: slot
11a, 12a, 141a: first welding portion
11b, 12b, 141b: second welding portion
13a, 142a: third welding portion
13b, 142b: fourth welding portion
15a: first gradient portion
15b: second gradient portion
17: inter-core welding portion

The invention claimed is:

1. An electric rotating machine with stator having-core back portions with welding portions comprising:
   a housing;
   a stator iron core that includes two or more stacked electromagnetic steel plates and has a core-back portion and tooth portions each extending from the core-back portion toward a radially inside thereof; and
   a rotor that is disposed at the radially inside of the stator iron core and is pivotably supported by a stator having the stator iron core,
   wherein the stator iron core is fixed to the housing through shrink-fitting or press-fitting,
   wherein the core-back portion has a welding portion that extends from a stacking-direction end portion along the stacking direction so as to ride on the two or more electromagnetic steel plates,
   wherein the welding portion is provided partly between the both stacking-direction end portions of the core-back portion,
   wherein the welding portion includes:
      a first welding portion formed from one end portion of the core-back portion in the stacking-direction to partway toward the center in the stacking-direction, and
      a second welding portion formed from other end portion of the core-back portion in the stacking-direction to partway toward the center in the stacking-direction,
   wherein the first welding portion being formed such that the welding width gradually decreases as it approaches the center in the stacking-direction from the one end portion, and wherein the second welding portion being formed such that the welding width gradually decreases as it approaches the center in the stacking-direction from the other end portion.

2. The electric rotating machine with stator having-core back portions with welding portions according to claim 1, wherein the welding portion is provided on an outer circumferential portion of the core-back portion.

3. The electric rotating machine with stator having-core back portions with welding portions according to claim 1, wherein the welding portion is provided in such a way as to penetrate the core-back portion in the stacking direction.

4. The electric rotating machine with stator having-core back portions with welding portions according to claim 1,
   wherein the first welding portion and the second welding portion each includes:
      a first gradient portion whose width gradually decreases from the stacking-direction end portion toward the stacking-direction center of the core-back portion, and
      a second gradient portion whose width gradually decreases from the first gradient portion toward the stacking-direction center, and
   wherein respective gradient angles of the first gradient portion and the second gradient portion are different from each other.

5. The electric rotating machine with stator having-core back portions with welding portions according to claim 1,
   wherein the stator iron core is configured in such a way that two or more division cores each including two or more stacked electromagnetic steel plates are aligned in a ring-shaped manner,
   wherein the division core has the core-back portion and a single tooth portion, and
   wherein the welding portion is provided in each of the two or more division cores.

6. The electric rotating machine with stator having-core back portions with welding portions according to claim 1,
   wherein the stator iron core is configured in such a way that two or more division cores each including two or more stacked electromagnetic steel plates are aligned in a ring-shaped manner,
   wherein the division core has the core-back portion and the two or more tooth portions, and
   wherein the welding portion is provided in each of the two or more division cores.

7. The electric rotating machine with stator having-core back portions with welding portions according to claim 1, wherein the stator iron core is configured by stacking two or more electromagnetic steel plates that are each integrally formed in a ring-shaped manner.

8. The electric rotating machine with stator having-core back portions with welding portions according to claim 7, wherein there are provided the two or more welding portions of which the number is a different from the number of poles of the electric rotating machine.

9. The electric rotating machine with stator having-core back portions with welding portions according to claim 7, wherein there are provided the two or more welding portions of which the number is a different from any divisor of the number of poles of the electric rotating machine.

* * * * *